United States Patent [19]

Berkey

[11] Patent Number: 4,620,861
[45] Date of Patent: Nov. 4, 1986

[54] METHOD FOR MAKING INDEX-PROFILED OPTICAL DEVICE

[75] Inventor: George E. Berkey, Pine City, N.Y.
[73] Assignee: Corning Glass Works, Corning, N.Y.
[21] Appl. No.: 794,833
[22] Filed: Nov. 4, 1985
[51] Int. Cl.⁴ ............... C03C 25/02; C03B 37/023
[52] U.S. Cl. .................... 65/3.12; 65/3.11; 65/13; 65/DIG. 16; 427/163
[58] Field of Search ............ 65/2, 3.11, 3.12, 13, 65/DIG. 16; 427/163

[56] References Cited

U.S. PATENT DOCUMENTS 3,823,995  7/1974  Carpenter ................... 65/3.12 X
4,203,743  5/1980  Saganuma et al. ........... 65/3.12 X

FOREIGN PATENT DOCUMENTS 607407  1/1985  Japan ..................... 65/DIG. 16

OTHER PUBLICATIONS

"Effects of Additives on Sintering of $CaF_2$, Haroun et al, Journal of the American Ceramic Society, vol. 54, #12, 7/1971, p. 640.

Primary Examiner—Robert Lindsay
Attorney, Agent, or Firm—K. van der Sterre

[57] ABSTRACT

Glass preforms for optical fibers or the like having refractive index profiles which vary in stepped or graded fashion across the preform, are made from porous glass preforms by introducing a first dopant into the porous preform during manufacture, partially sintering the preform to selectively modify the internal surface area thereof, introducing a second vapor-infusible dopant into the selectively sintered preform to cause selective doping of the porous glass, and then consolidating the resulting doped preform to clear glass.

14 Claims, 8 Drawing Figures

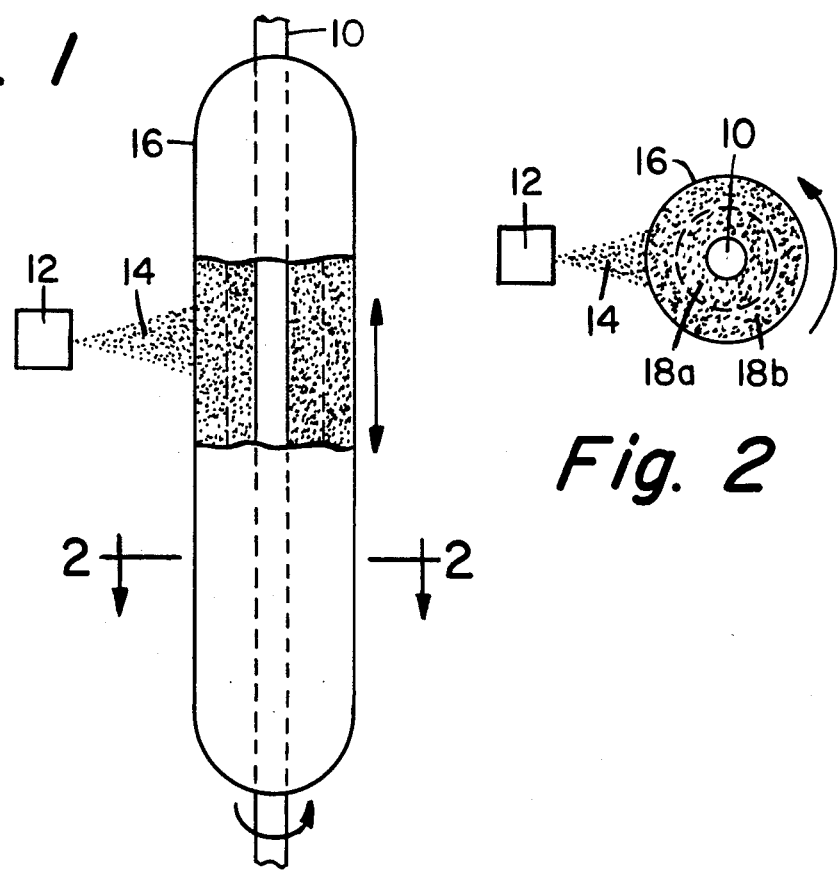
Fig. 1
Fig. 2
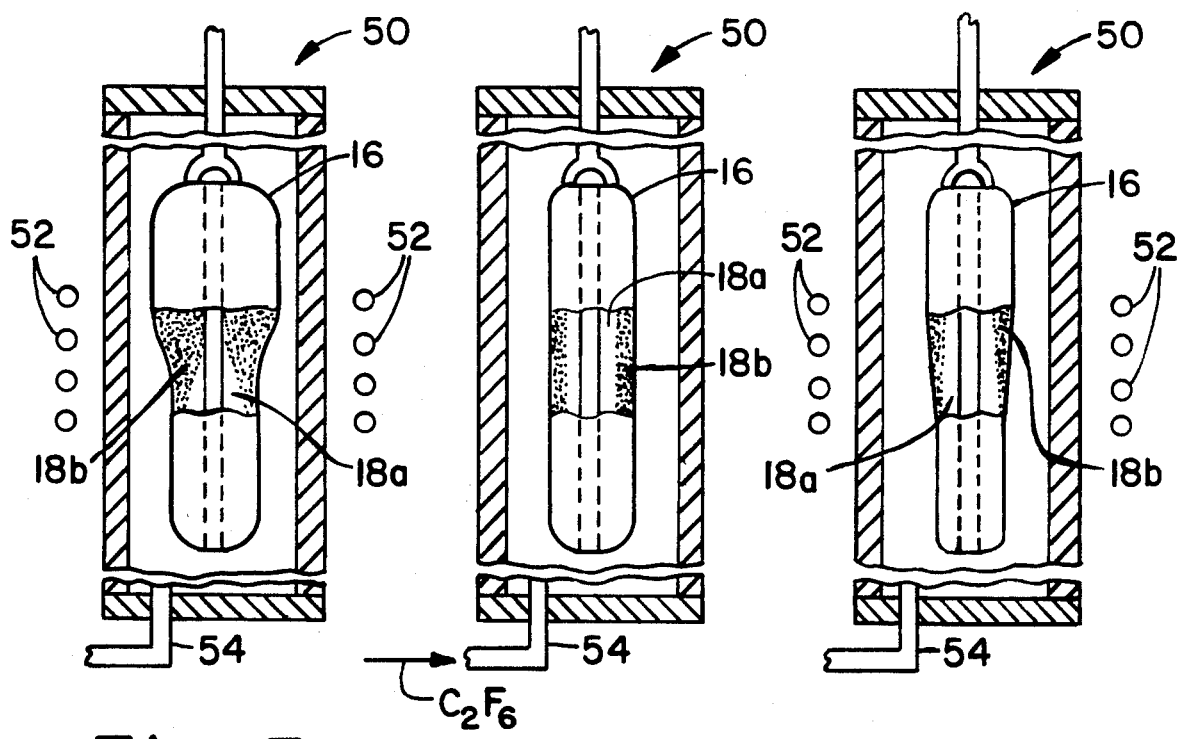
Fig. 3
Fig. 4
Fig. 5

METHOD FOR MAKING INDEX-PROFILED OPTICAL DEVICE

BACKGROUND OF THE INVENTION

A. Field of the Invention

The present invention relates to a method for making optical devices with predetermined refractive index profiles, e.g., refractive index gradients. More particularly, the invention relates to a method for treating porous preforms composed of vapor-deposited silica glass or the like to modify the refractive index of selected regions thereof.

B. Description of the Prior Art

Vapor deposition of doped silica is the most commonly employed technique for forming optical waveguide fibers. Such fibers are usually doped with $GeO_2$ or $P_2O_5$ to form a glass having a refractive index greater than that of silica, or with $B_2O_3$ or fluorine to form a glass having a refractive index less than that of silica. Because of its low absorption at long wavelengths, fluorine is preferred over $B_2O_3$ for transmission at wavelengths beyond approximately 1.2 Mm.

Fluorine has been employed as the sole dopant in single-mode fibers having a silica core and a fluorine-doped silica clad. Fluorine has also been added along with other dopants in the core of a single-mode fiber to change the zero dispersion wavelength, and it has been added with other dopants to obtain a desired combination of properties such as refractive index and viscosity. For example, fluorine and $P_2O_5$ can be added to silica to form a diffusion barrier having the same refractive index as a silica substrate tube.

Difficulties have been encountered in trying to deposit fluorine directly as a dopant in vapor-deposited glass. U.S. Pat. No. 4,335,934 reports that fluorine tends to reduce the rate of deposition of doped silica glass on the inner surface of a substrate tube. It has been found that the addition of a fluorine-containing compound to the reactant stream emitted by a flame hydrolysis burner tends to decrease the rate of deposition of glass soot collected on the mandrel. Also, seeds were commonly formed in the resultant article when both fluorine and germania were co-deposited with silica.

A further disadvantage has been experienced while attempting to form fluorine-doped silica by supplying $C_2F_6$ to a flame hydrolysis burner. Even though the amount of $C_2F_6$ is increased, it is difficult to increase the amount of fluorine in the resultant glass to more than about 0.6 wt. %. This may be due to the fact that a fluorine-doped silica particle may not be immediately formed in the burner flame; rather, the fluorine must diffuse into the silica particle as it travels from the burner to the soot preform. Such diffusion must take place within a fraction of a second. The partial pressure of fluorine adjacent to the silica particle is very low since the fluorine supplied to the flame diffuses into the ambient atmosphere. Furthermore, some of fluorine adjacent the silica particle reacts with hydroxyl ions present in The flame to form HF; this fluorine is no longer available to dope the particle.

A more successful approach to the doping of vapor deposited silica or doped silica glass has involved the treatment of the glass with fluorine after deposition as a porous material but prior to consolidation of that material to clear glass. In this process, the porous preform is contacted with gaseous fluorine or a fluoride compound which is then absorbed into the glass as an index-modifying dopant.

In published French patent application No. 2,428,618, an optical fiber having a graded index core and cladding wherein fluorine is the only dopant is produced by depositing porous silica layers on a starting member, heating the porous preform to cause partial sintering but not complete fusion, and then forming an index gradient in the preform by the slow diffusion of fluorine into the preform. Doping profiles attainable by this technique are however limited to diffusion gradients; step profiles and/or control of the slope of the gradient are not feasible.

Published Japanese patent application No. 56-50136 describes a fluorine treatment for use with graded index preforms which is intended to tailor the peripheral index profile of the core preform to improve fiber bandwidth. In that method the preform is not sintered prior to treatment in the fluorine (or boron-containing) atmosphere, but the nature of the fluorine treatment is such that only the edge profile of the core of the preform is adjusted.

In published European patent application No. EP0139532, the fluorine treatment described is applied to the entire cross-section of a preform, effecting a general decrease in refractive index across most or all of the preform diameter. In that process, the preform is first heated to a temperature below sintering for dehydration, and is then further heated in the presence of fluorine at a temperature below that of rapid consolidation to uniformly reduce the refractive index of the preform. If the core material of the preform is supplied as a glass rod or a high density soot layer, the fluorine treatment affects mainly the refractive index of the cladding material.

In each of these prior art methods for doping porous soot preforms with vaporized dopants such as fluorine or boron, control over the exact doping profile is difficult or inexact. Only step profiles and diffusion gradients are described; thus the choice of doping profile is limited and in some cases the attainment of a specific profile may require extra process steps, such as separate drying, doping, and consolidation of the core and cladding elements.

SUMMARY OF THE INVENTION

The present invention provides a method for doping porous glass soot preforms with vaporized dopants such as flourine or boron which offers more flexible refractive index profile control than prior art techniques. The method generally involves a density profiling heat treatment, subsequent to glass soot deposition but prior to treatment with the vaporized dopant, wherein the preform is heated to develop a density profile corresponding to a doping profile desired in the final product.

Broadly characterized, the invention includes an improved method for using a vaporized dopant to provide a glass preform with a selected stepped and/or graded refractive index profile across at least one cross-sectional dimension thereof. In accordance with that method, a porous soot preform comprising $SiO_2$ and at least one codeposited dopant is first provided. The codeposited dopant, which may be $GeO_2$, $P_2O_5$, $B_2O_3$, $TiO_2$, $MgO$, $Al_2O_3$ or any of the other known conventional dopants capable of being deposited as oxides with $SiO_2$ to form a glass, is one which reduces the softening temperature of $SiO_2$ when combined therewith in a glass. Further, the codeposited dopant is introduced in a varying concentration to provide a selected stepped and/or graded concentration profile across the cross-sectional dimension of the preform, in order to generate within the preform zones of relatively high dopant concentration and zones of relatively low dopant concentration.

The glass soot preform thus provided is next heated, after dehydration if desired, to a temperature below the sintering temperature of undoped fused $SiO_2$ but above a temperature effective to at least partially sinter one or more of the zones of relatively high codeposited dopant concentration in the preform. The sintering resulting from this heating step produces a selectively densified preform with a stepped and/or graded density profile, corresponding to the original dopant profile, such that the preform comprises zones of relatively low internal surface area, originally comprising higher dopant concentrations, and zones of relatively high internal surface area containing little or no codeposited dopant.

The selectively densified preform resulting from the heating step is next exposed to an atmosphere comprising a vaporized second dopant, such as fluorine, for a time sufficient to permit internal absorption of the second dopant by the preform. Due to the higher porosity or surface area of zones within the preform not highly sintered by the previous heating step, absorption of the dopant will be more extensive in these zones than in partially or fully sintered zones, thus resulting in a concentration profile for the second vaporized dopant corresponding generally to the internal surfae area fluctuations within the preform. Typically, the result is relatively high levels of doping of preform zones not comprising the initially codeposited dopant, and little or no doping of zones comprising high concentrations of the initial dopant.

Finally the preform doped as described is consolidated to clear glass by further heating, the resulting glass having a refractive index profile which is the result of the combined effects on index of the originally codeposited dopant(s) and the absorbed vaporized dopant(s). Using these effects, refractive index profiles comprising step changes, gradient changes, and combinations thereof, which profiles are not conveniently attainable using other techniques for doping with agents such as fluorine or boron, are conveniently achieved.

DESCRIPTION OF THE DRAWING

The invention may be further understood by reference to the drawing, wherein:

FIG. 1 schematically illustrates the preparation of a porous glass preform by flame oxidation;

FIG. 2 schematically illustrates the deposition of multiple zones of porous glass in a flame oxidation process;

FIG. 3 schematically illustrates a selective sintering step for a porous glass preform;

FIG. 4 schematically illustrates the step of vapor-doping a selectively sintered porous glass preform with fluorine;

FIG. 5 schematically illustrates a final consolidation step for converting a porous glass preform to a clear glass preform;

DETAILED DESCRIPTION

Figure 6:
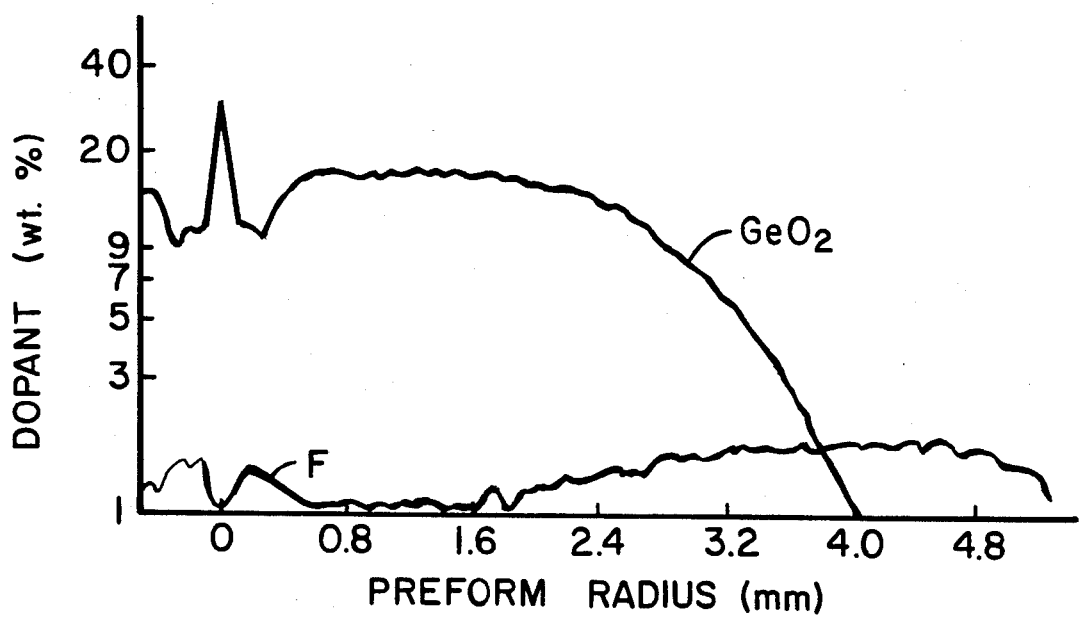
FIGS. 6–8 plot the relative concentrations of each of a codeposited and vaporized dopant for glass preforms or fibers provided according to the invention.

The method of the invention is particularly useful in the manufacture of cylindrical glass preforms used for drawing into optical waveguide fibers. The following description is therefore with reference to preforms of this type even though the invention is not limited thereto. The information-carrying capacity of such fibers directly depends on the radial refractive index profile of the fiber, i.e., the refractive index profile of the fiber along the radial cross-sectional dimension from the fiber center to the outer circumference.

In one useful technique for making glass preforms for optical waveguide fibers, described for example in U.S. Pat. No. 3,823,995, cylindrical preforms are built up by depositing $SiO_2$-containing glass particles or soot from a flame oxidation burner onto a rotating mandrel to form a succession of porous glass layers. Radial variations in refractive index are easily generated in these preforms by introducing varying amounts of dopants into the glass as it is deposited. By this technique, essentially any desired index profile obtainable in a doped silica glass, whether a step profile, a graded index profile, or a combination profile comprising stepped and graded portions, can be generated by appropriately controlling the duration and amount of dopant source compound supplied to the burner.

Dopants which can be introduced into cylindrical porous silica glass preforms by this technique include $GeO_2$, $P_2O_5$, $TiO_2$, $B_2O_3$, $Al_2O_3$, MgO and other glass-modifying oxides, and also small amounts of elemental dopants such as fluorine. Source compounds suitable for flame oxidation with $SiCl_4$ to effect the codeposition of these dopants with $SiO_2$ include $GeCl_4$, $POCl_3$, $BCl_3$, $AlCl_3$, $TiCl_4$ and vaporized fluorocarbons such as $C_2F_6$.

In the practice of the invention, dopants to be introduced into the preform during the flame oxidation and deposition process (termed codeposited dopants) are those dopants which reduce the softening temperature of the doped silica glass below the softening temperature of undoped fused silica, the latter temperature being taken as approximately 1580° C. Most preferably, the dopant will be one which can be added in quantities sufficient to significantly reduce the softening temperature of fused silica without causing phase separation or devitrification of the glass. Examples of preferred codeposited dopants for this purpose are $GeO_2$, $P_2O_5$, $TiO_2$ and $B_2O_3$. With each of these dopants, the degree of softening is substantially proportional to the degree of doping, so that good control over the softness of each layer of glass deposited on the preform can be obtained. Thus a preform having clearly defined zones of predetermined softening temperature can readily be made by conventional deposition techniques.

FIGS. 1 and 2 of the drawing schematically illustrate the application of the above-described procedures to the making of a preform useful in the present invention. In FIG. 1, a flame oxidation burner 12 generates silica-containing soot 14 which is deposited on rotating and axially reciprocating mandrel 10 to form a layered porous soot preform 16. In FIG. 2, showing porous preform 16 in cross-section, multiple zones 18a and 18b have been deposited during the glass deposition process, zone 18a comprising a relatively highly doped silica-containing glass and zone 18b a silica-containing glass comprising little or no dopant. The porous glass in zone 18a therefore has a lower softening point than the porous glass in zone 18b.

After a porous glass preform incorporating a predetermined doping profile has been prepared, it is next subjected to a heat treatment to cause selective sintering thereof. As is well know, the consolidation or sintering temperatures of porous glasses produced by flame oxidation, while directly related to the softening temperature of the glass composition, generally fall substantially below the actual softening temperature due to the high surface energy of the porous material. For example, an undoped silica glass preform can be rapidly sintered at 1400° C. Nevertheless, for any silica or doped silica glass composition employed in the invention, the effective sintering temperature can readily be determined by routine experiment. Therefore, for each preform, a range of temperature can be identified below which no internal sintering and consolidation will occur, and above which the entire preform will rapidly consolidate to clear glass.

Within the temperature range bounded by the onset of consolidation and the rapid and complete consolidation of the entire preform, a temperature or temperature range can be selected wherein selective sintering, i.e., sintering or partial consolidation of only certain zones within the preform, will proceed at a moderate rate. Sintering at a moderate rate is a preferred practice because it permits the softer zones within the preform to be only partially consolidated. Such partially consolidated glass remains permeable to vaporized dopants during the subsequent vapor doping step, so that, while its absorpiton of vaporized dopant is low, it does not act as an impermeable barrier to dopant movement within the porous preform.

In some cases it may be desirable to achieve complete consolidation of one or more selected zones within the preform. When this is desired, a sintering temperature is selected at which rapid consolidation of the selected zone(s), with little or no sintering of the remaining zones within the preform, will occur. This procedure can be effective, for example, where it is desired to make the inner core zone of a porous preform highly resistant to refractive index modification by the vaporized dopant.

The actual heating temperature used to obtain selective sintering of a soot preform can readily be determined by routine experiment, but the maximum temperature utilized will generally not exceed about 1400° C., the temperature at which undoped fused silica will rapidly consolidate. The minimum sintering temperature used depends upon the composition and softening temperature of the softest glass in the preform. For most doped silica glasses, however, temperatures below 1200° C. will not normally be effective to cause appreciable sintering. Therefore selective sintering is preferably carried out at a temperature in the range of about 1200°–1400° C.

The process of selective sintering is schematically illustrated in FIG. 3 of the drawing, wherein a cylindrical porous glass soot preform 16 is being selectively sintered within a consolidation furnace 50. As the preform 16 is lowered through the hot zone of furnace 50 indicated by heating coils 52, zone 18a of preform 16 is selectively sintered, thereafter exhibiting relatively low internal surface area, while zone 18b is less affected at the heating temperature employed and retains a relatively high internal surface area.

After selective sintering of the soot preform has been carried out, the preform is next subjected to a second doping step wherein a vaporized dopant is infused into the preform. The preferred vaporized dopant is fluorine, which can be introduced either as fluorine gas or as a gaseous fluorine compound such as $C_2F_6$ which releases fluorine at elevated temperatures. Known procedures for doping porous soot preforms with vaporized dopants such as fluorine can be used for this step. Typically, such procedures comprise heating the soot preform in a suitable furnace to a temperature at or below its consolidation temperature, e.g. 1100°–1400° C., and flowing an atmosphere comprising fluorine or a fluorine-containing gas into the furnace and around the preform for a time sufficient to cause absorption of the dopant by the preform.

While the preferred dopant for use in the invention is fluorine, other vaporizable dopants such as boron may alternatively or additionally be employed. To utilize a combination of these dopants, $BF_3$ gas constitutes a useful vapor source of both F and B.

The vapor-phase doping of a selectively sintered soot preform as a separate and distinct process step is schematically illustrated in FIG. 4 of the drawing., In that illustration, selectively sintered soot preform 16 comprising zone 18a of relatively low internal surface area and zone 18b of relatively high internal surface is positioed in a heated furnace. While the furnace is being maintained at a temperature sufficient to permit the release of flourine and the absorption of fluorine by the soot preform, $C_2H_6$ gas from inlet 54 is flowed into furnace 50 and around preform 16. Absorption of fluorine by the preform is relatively high in zone 18b and relatively low in zone 18a, due to the difference in internal surface area between the two zones.

It is possible and frequently preferred to carry out the treatment of the selectively sintered porous soot preform with the vaporized dopant contemporaneously with a final consolidation treatment wherein the preform is fully consolidated to clear the glass. However, sufficient time should be allowed during the treatment with the dopant to permit access by the dopant to all porous zones within the preform, so that dopant infusion into all porous zones within the preform is substantially uniform. This is because the best control over refractive index profile is obtained when dopant absorption during the vapor doping step is limited by the internal surface area of the preform, rather than by the dopant infusion rate, i.e., the time required for the dopant to diffuse to internal regions within the preform and become available for reaction with the glass. Diffusion-limited processes tend to produce graded index profiles wherein the degree of grading and the refractive index profiles at the gradient boundaries cannot be closely controlled, and thus are preferably avoided.

After the selectively sintered porous glass soot preform has been doped to the desired degree with the vaporized dopant, it may be consolidated to clear glass by further heating. Known consolidation procedures for converting porous soot preforms to clear glass may be utilized.

A typical consolidation process as a separate and distinct process step is schematically illustrated in FIG. 5 of the drawing. In that diagram, a porous glass soot preform 16 which has been selectively doped as in FIG. 4 is lowered through the hot zone of a consolidation furnace 50 heated by heating coils 52. The consolidation temperature used is sufficient to fully consolidate both of zones 18a and 18b of the preform to clear glass.

In most porous glass soot preforms produced by flame oxidation and intended for the manufacture of optical waveguide fiber, a drying step is needed to remove adsorbed water and bound hydroxyl groups from the porous glass preform prior to consolidation to clear glass. This step typically involves treating the porous preform with a drying gas such as a gaseous chlorine drying agent.

In practicing the method of the present invention, this drying step can be carried out at any point after the porous preform has been made and prior to complete consolidation of any zone in the preform. For example, drying could be carried out immediately after the preform has been prepared, or during the process of selective sintering, or during the treatment with vaporized dopant, if no zone of the preform has been completely consolidated prior to treatment. If selective sintering, vapor doping and final consolidation are carried out sequentially in the same consolidation furnace, drying is preferably carried out prior to or simultaneously with selective sintering. However, drying may be continued and completed during final consolidation of the preform, if desired.

The invention may be further understood by reference to the following examples illustrating the preparation of cylindrical optical waveguide preforms in accordance therewith.

EXAMPLE 1

$SiCl_4$ vapor from a reservoir of liquid $SiCl_4$ and $GeCl_4$ vapor from a reservoir of liquid $GeCl_4$ are transported by separate flowing oxygen carrier gas streams to a flame oxidation burner where they are mixed and then oxidized in a natural gas/oxygen flame to form a soot consisting of fine particles of $SiO_2$ doped with (codeposited) $GeO_2$. The $GeO_2$-$SiO_2$ glass soot, in the form of a continuous soot stream, is deposited on a rotating alumina mandrel which is reciprocated in a direction parallel to the mandrel axis within the soot stream to collect a uniform coating of soot along the length of the mandrel. As the soot is deposited on the mandrel, the concentration of the $GeO_2$ dopant is varied in non-uniform fashion from a maximum initial value of 28% by weight for the initial layers to $GeO_2$-free $SiO_2$ glass for the outer half of the radius of the soot preform, the total preform radius being about 70 mm, and the overall length being about 80 cm.

After the porous soot preform has been prepared it is removed from the alumina mandrel and prepared for selective sintering in a conventional drying and consolidation furnace. The preform is vertically suspended from a chlorine feed line, and the preform is slowly lowered into the consolidation furnace while a drying gas consisting essentially of 2% $Cl_2$ and the remainder helium is fed into the top of the preform via a fused silica tube. The heated zone of the consolidation furnace is operated at a temperature of 1300° C., which is sufficient to cause both complete drying of the preform and partial sintering of those zones within the preform which are highly doped with $GeO_2$. The preform is slowly lowered through the hot zone of the furnace to achieve the partial sintering in gradient or progressive fashion along the length of the preform.

After the preform has been selectively sintered as described it is raised to the top of the consolidation furnace and a doping gas mixture for introducing a fluorine dopant into the preform is introduced into the furnace through a bottom inlet. The doping gas mixture consists essentially of 16% $C_2F_6$, 1% $Cl_2$, and 83% helium by volume, and is introduced at flow rate of 25 slpm.

With the fluorine doping atmosphere flowing through the furnace, the temperature of the hot zone is raised to 1430° C. and the preform is slowly lowered through the furnace to achieve fluorine doping and final consolidation to clear glass. The porosity of the preform and the rate of progressive consolidation are sufficiently slow to insure that the level of doping within the preform is not limited by the rate of fluorine diffusion into the pores, but rather is dictated primarily by the internal surface area of each zone of the preform. After consolidation of the preform to clear glass, it is drawn down into glass rod of approximately 10 mm diameter for profile analysis.

FIG. 6 of the drawing shows the relative concentrations of the codeposited $GeO_2$ dopant and the vapor-transported fluorine dopant over the radius of the consolidated glass preform produced as above described. The upper line plots $GeO_2$ content as a function of radius, while the lower line plots the fluorine content at the corresponding radius.

Because the selective sintering step was carried out at a relatively moderate sintering temperature of 1300° C., complete consolidation does not occur over the bulk of the preform radius. Thus, for example, the large $GeO_2$-doped region at radius 0.8–1.6 mm, containing about 17% $GeO_2$, retains a significant internal surface area and picks up about 1% F by weight during the gas phase doping step.

The substantial degree to which the fluorine content of the glass can track the degree of sintering is evident from a study of the profile corresponding to the central section of the preform shown in FIG. 6. Beginning at the indicated centerline (0 mm) of the preform, the $GeO_2$ content first decreases from an initial value of about 28 weight percent to a concentration below 10%, then increases again to approximately 17% at 0.8 mm radius. Thus the centerline and the zone of 17% $GeO_2$ glass are the softest zones in the preform, and were the most highly sintered during the selective sintering step. Reflecting this circumstance, the fluorine content of the illustrated section, while relatively low at the centerline and in the outer 17% $GeO_2$ zone, increases substantially in the 10% $GeO_2$ zone located adjacent to the central region.

EXAMPLE 2

A porous glass soot preform consisting essentially of $SiO_2$ and codeposited $GeO_2$ is prepared substantially as described in Example 1, except that the concentration of the codeposited $GeO_2$ dopant is varied from a maximum of 18% by weight in the initially deposited soot layers to $GeO_2$-free $SiO_2$ glass for the outer 10% of the preform diameter.

The porous glass soot preform thus prepared is heated for drying and selective sintering in a consolidation furnace as desribed in Example 1, except that selective sintering is carried out at a furnace hot zone temperature of 1340° C. instead of 1300° C. This heating effects substantially complete sintering of those zones within the preform containing more than about 18% $GeO_2$ by weight, while still leaving high internal surface area in preform zones containing 5% or less of $GeO_2$.

Following selective sintering, the preform is raised again to the top of the furnace, the temperature of the hot zone of the furnace is raised to 1430° C. and a flowing atmosphere containing a fluorine dopant, introduced as $C_2F_6$, is admitted into the furnace through a bottom port as in Example 1. The doping atmosphere consists essentially of 16% $C_2F_6$ and the balance helium by volume, and is introduced at a flow rate of 25 SLPM. The selectively sintered preform is then slowly lowered through the consolidation zone to simultaneously achieve fluorine doping and complete consolidation to clear glass. After consolidation the glass preform is drawn into glass rod about 10 mm in diameter for further analysis.

Figure 7:
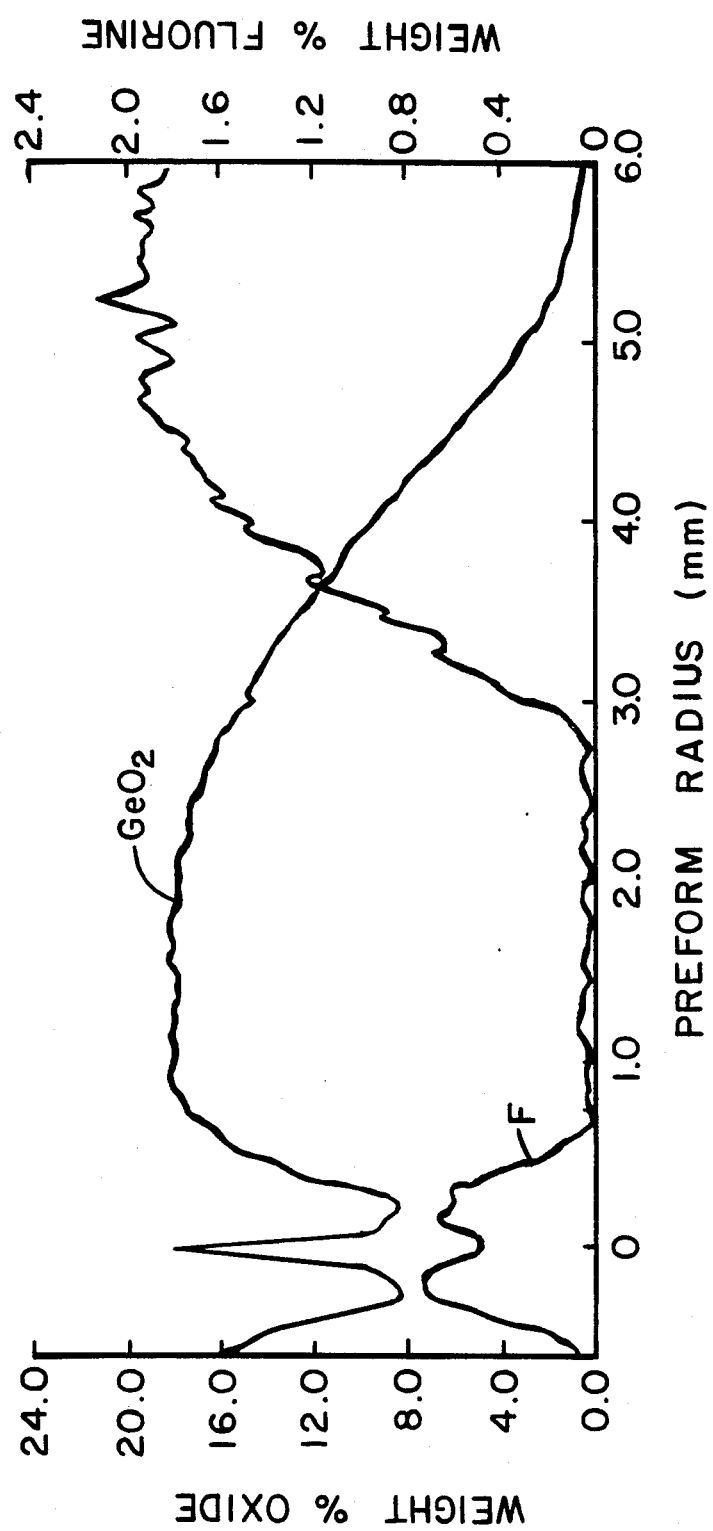

FIG. 7 of the drawing is a plot showing the relative concentrations of the codeposited $GeO_2$ dopant and the vapor-transported fluorine dopant over the radius of the consolidated glass rod preform produced as above described. The line labeled '$GeO_2$' plots $GeO_2$ content as a function of radius on the scale shown on the left hand vertical axis of the graph. The line labeled 'F' plots fluorine content at corresponding radii on the scale shown on the right hand axis of the graph.

As in FIG. 6, the fluorine profile shown in FIG. 7 shows good inverse correspondence with the $GeO_2$ content. However, by virtue of the higher consolidation temperature used, fluorine has been substantially excluded from the intermediate, high-$GeO_2$ sections of the preform, while good grading of the fluorine content in the peripheral or low $GeO_2$-content core region has been obtained.

While the foregoing examples refer to the use of fluorine as the second or vapor-infused dopant, it will readily be apparent that equivalent dopants for reducing refractive index, such as boron or a mixture of boron and fluorine could be used in place of fluorine for the vaporized dopant. The use of $BF_3$ as the second dopant would be particularly preferred where a combination of boron and fluorine as the vaporized dopant is to be used. The following example illustrates the use of $BF_3$ as a vapor-infused dopant in accordance with the invention.

EXAMPLE 3

A porous glass soot preform consisting essentially of $SiO_2$ and codeposited $GeO_2$ is prepared substantially as described in Example 1, except that the concentration of the codeposited $GeO_2$ dopant is gradually reduced from a maximum of approximately 30% $GeO_2$ at the preform center to $GeO_2$-free glass at the preform periphery.

The porous glass soot preform thus prepared is heated for drying and selective sintering in a consolidation furnace as described in Example 1, except that selective sintering is carried out at a furnace hot zone temperature of 1335° C., in an atmosphere consisting of 2% $Cl_2$ and the remainder helium, at a flow rate of approximately 30 slpm. This heating effects substantially complete sintering of those zones within the preform containing more than about 18% $GeO_2$ by weight, with progressively less sintering toward the outer regions of the preform.

Following selective sintering, the temperature of the hot zone of the consolidation furnace is raised to 1450° C. and a flowing atmosphere containing a $BF_3$ vapor dopant is introduced into the furnace. The atmosphere consists of about 5% $BF_3$, 2% $Cl_2$ and the remainder helium by volume, and is introduced at a flow rate of approximately 32 slpm. The selectively sintered preform is slowly lowered through the hot consolidation zone to simultaneously achieve complete consolidation and doping with boron and fluorine. After consolidation, the preform is drawn into optical fiber of approximately 80 microns diameter for anaylsis.

Figure 8:
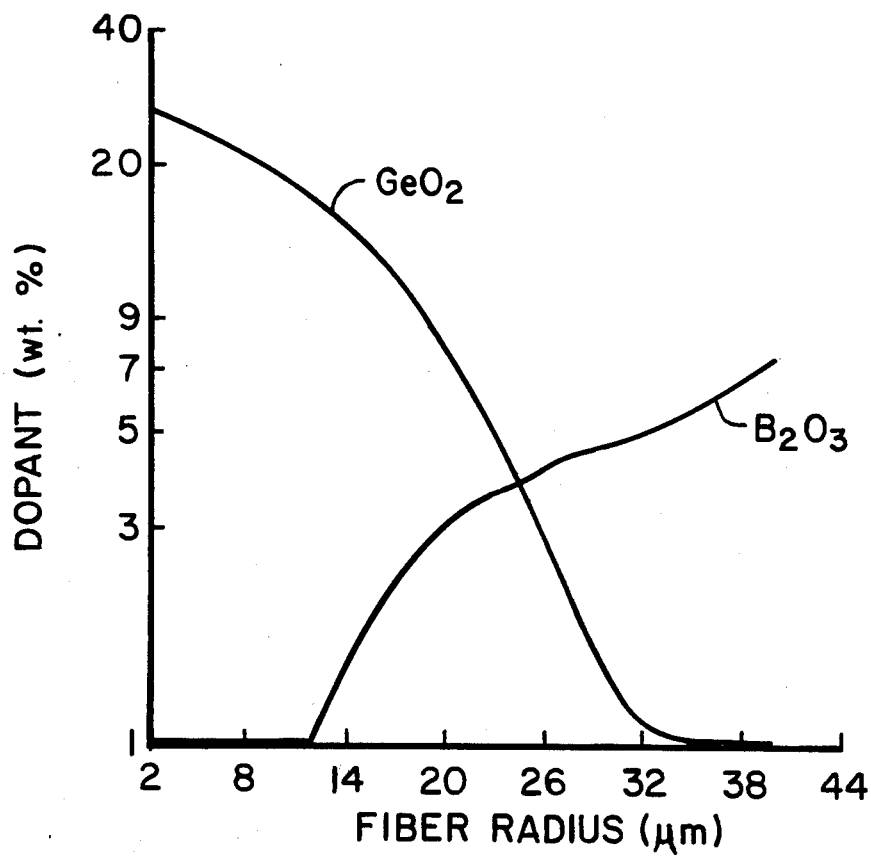

FIG. 8 of the drawing is a plot showing the relative concentrations of the codeposited $GeO_2$ dopant and the vapor-infused $B_2O_3$ dopant over the radius of the optical fiber produced as above described. The line labeled '$GeO_2$' plots the decreasing $GeO_2$ content of the fiber from a point near the fiber axis to the outer extreme of the fiber radius, while the line labeled '$B_2O_3$' plots the $B_2O_3$ content of the fiber as it increases from zero to 8% by weight over fiber radius values from about 12 microns to 40 microns. Again, the degree of $B_2O_3$ doping is found to be proportional to the surface area of the porous glass retained after the selective sintering step. The fluorine content of this preform was not reported, but for other $GeO_2$-graded preforms similarly processed was found to decrease from a maximum value of approximately 0.7% F by weight at the fiber periphery to zero fluorine in internal preform zones, in approximate correspondence with the $B_2O_3$ profile.

Of course it will be apparent from the foregoing description that the invention is not limited to the use of vapor-infused dopants which depress the refractive index of silica. The invention may also be extended to the use of vapor-infusible dopants which raise the refractive index of fused silica, e.g., MgO or $Al_2O_3$, provided such dopants can be vaporized in a suitable form for diffusion into and irreversible absorption by porous fused silica glass to an extent proportional to the internal surface area of the preform, after selective sintering of the preform in accordance with the invention.

I claim:

1. A method for making a glass article having a non-uniform refractive index profile across at least one internal dimension thereof which comprises the steps of:
   (a) forming a porous doped fused silica glass preform for the article, the composition of the doped fused silica preform including at least a first dopant which is effective to reduce the softening temperature of fused silica and which varies in concentration across at least one internal dimension of the preform;
   (b) heating the porous glass preform to cause selective sintering and loss of internal surface area within the pore structure thereof, the degree of sintering varying across the internal dimension of the preform in a manner corresponding to the variations in dopant concentration thereacross;
   (c) infusing a vaporized second dopant into the pore structure of the preform to cause doping of the preform by the second dopant, the degree of doping by the second dopant varying across the internal dimension of the preform in a manner corresponding to the degree of sintering thereacross; and
   (d) consolidating the doped preform to a clear glass article having varying concentrations of the first and second dopant and a non-uniform refractive index profile across the internal dimension.

2. A method of providing a cylindrical glass preform having a stepped and/or graded refractive index profile across its diameter which comprises the steps of:
   (a) forming a cylindrical porous soot preform comprising $SiO_2$ and at least one codeposited dopant selected from the group of dopants effective to reduce the softening temperature of $SiO_2$ when combined therewith in a glass, said codeposited dopant being introduced in a varying concentration to provide a stepped and/or graded dopant concentration profile across the radius of said preform, the preform thus comprising zones of relatively high dopant concentration and zones of relatively low dopant concentration;

(b) heating the porous soot preform for selective sintering at a temperature below the sintering temperature of undoped fused silica but above a temperature effective to at least partially sinter at least one domain of relatively high dopant concentration in said preform, the resulting preform comprising a stepped and/or graded density profile across the preform radius comprising domains of relatively low internal surface area and domains of relatively high internal surface area;

(c) exposing the cylindrical preform to an atmosphere comprising a vaporized second dopant, said exposure being for a time sufficient to permit internal absorption of the second dopant by the preform, said absorption being higher in domains of relatively high internal surface area within the preform than in domains of relatively low internal surface area; and (d) heating the cylindrical porous soot preform to consolidate it to a clear glass preform having a stepped and/or graded refractive index profile across its diameter.

3. A method in accordance with claim 2 wherein the codeposited dopants effective to reduce the softening temperature of $SiO_2$ are selected from the groups consisting of $GeO_2$, $P_2O_5$, $B_2O_3$, $Al_2O_3$, MgO and $TiO_2$.

4. A method in accordance with claim 3 wherein the codeposited dopant is $GeO_2$, $P_2O_5$, $TiO_2$ or $B_2O_3$.

5. A method in accordance with claim 4 wherein the cylindrical porous soot preform is formed by the flame oxidation of compounds selected from the group consisting of $SiCl_4$, $POCl_3$, $TiCl_4$ and $BCl_3$.

6. A method in accordance with claim 3 wherein the porous soot preform is heated for selective sintering at a temperature in the range of 1200°–1400° C.

7. A method in accordance with claim 6 wherein the porous soot preform is heated for selective sintering while being treated with a drying gas.

8. A method in accordance with claim 7 wherein the drying gas consists essentially of a mixture of chlorine and helium.

9. A method in accordance with claim 3 wherein the vaporized second dopant is a compound which depresses the refractive index of fused silica.

10. A method in accordance with claim 3 wherein the vaporized second dopant is a compound which raises the refractive index of fused silica.

11. A method in accordance with claim 9 wherein the vaporized second dopant is fluorine or $B_2O_3$.

12. A method in accordance with claim 11 wherein the vaporized second dopant is fluorine.

13. A method in accordance with claim 11 wherein the cylindrical preform is exposed to an atmosphere comprising the vaporized second dopant while being consolidated to clear glass.

14. A method in accordance with claim 13 wherein the atmosphere comprising the vaporized second dopant further comprises a chlorine-containing drying gas.

* * * * *